Patented Jan. 12, 1937

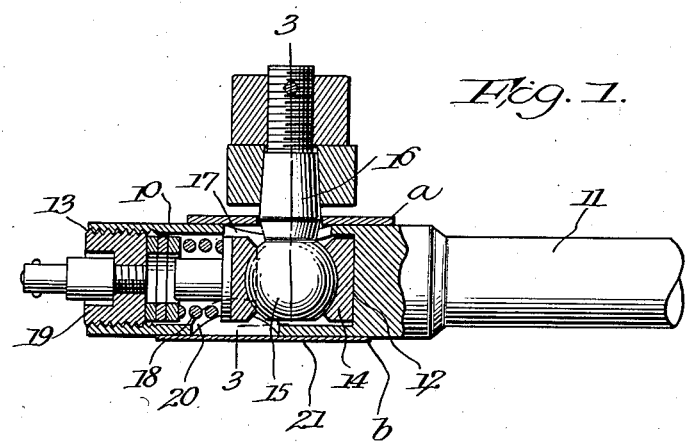
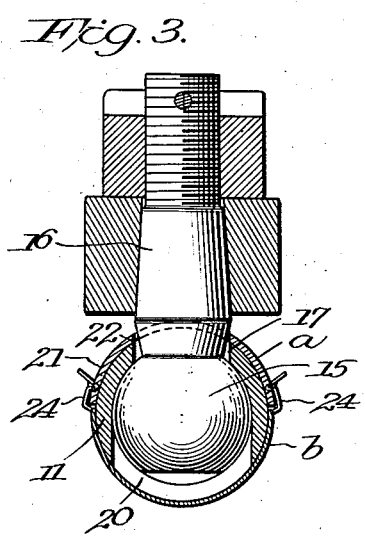
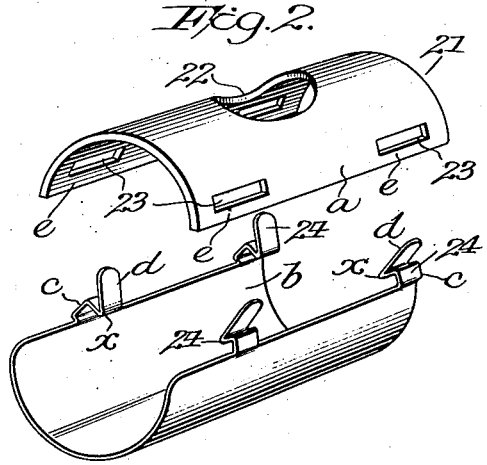
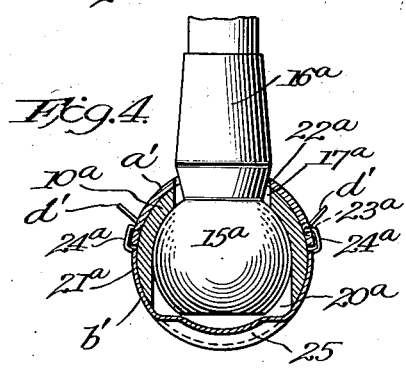
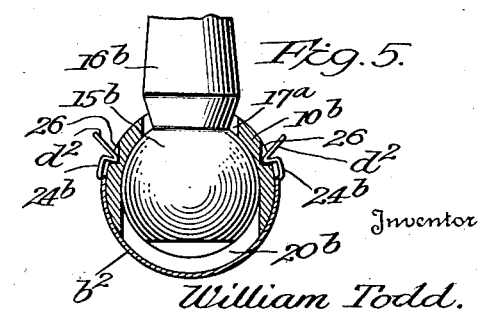

2,067,553

UNITED STATES PATENT OFFICE 2,067,553

BALL AND SOCKET JOINT

William Todd, Leominster, Mass.

Application June 21, 1933, Serial No. 676,973

9 Claims. (Cl. 287—90)

The present invention is a cover or guard for the sockets of universal joints particularly of the type shown in the United States patent to Green 1,375,905, and in applicant's co-pending application Serial No. 614,010.

The object of the invention is to provide a very economical cover or guide of simple construction, yet durable and efficient for the purpose of excluding dust and dirt from the interior of the joint and to retain or confine the grease or other lubricant within the joint, as well as to serve as a closure for an assembly opening to prevent disconnection of the joint or movement of any of the parts therethrough, should any of the parts become lost or broken.

With the above and other objects in view the invention resides further in the novel and sundry details of construction, combination and arrangement of the parts hereinafter more fully described and pointed out in the appended claims.

In the drawing which illustrates the embodiment of the invention as at present devised, Fig. 1 is a longitudinal sectional view through a universal joint to which the present invention is applicable and showing the same applied thereto.

Fig. 2 is a perspective view of the cover or guard of the present invention and showing its cooperating parts disconnected;

Fig. 3 is a transverse sectional view taken substantially on line 3—3 of Fig. 1 and equipped with the guard shown in Fig. 2;

Fig. 4 is a view similar to Fig. 3 showing one section of the guard slightly modified in construction; and Fig. 5 is a view similar to Fig. 3, illustrating a further modified use of the cover or guard, that is the use of the guard without one of the sections as shown in Fig. 2.

The type of ball and socket joint to which the present invention is particularly applicable comprises a cylindrical or tubular socket 10, usually forming the extension 11 of a rod or link of metal. The cylinder is closed at one end 12, and opened at its other end 13, the end 12 forming a seat for one of the ball seat members 14, of which there are usually two, one on each side of a spherical ball 15 having an integral stem or shank 16, usually threaded, to receive an end of a rod, link or other joint. The shank 16 of the ball extends through an opening 17 in the side wall of the cylinder to permit a certain free, lateral or swivelling movement thereof, and this assembly is held tightly together by a compression spring 18, interposed between the other seat member 14 and a plug or cap 19, closing the open end of the cylinder, and is usually externally threaded to engage internal threads on the outer end of the sleeve.

Opposite the opening 17, but preferably off-set with respect to the central axis thereof, is an opening 20 formed in the sleeve 10, and of such dimensions as will permit the shank 16 and the ball 15 to be passed therethrough angularly with respect to the axis thereof, so that the shank may be also passed through the opening 17 and the ball shank moved within the interior of the sleeve 10, to the position shown in Figure 1 of the drawing. In this assembled position, the stem 16 extends through the opening 17 and the ball will be moved laterally by the spring 18 from opposite the opening 20 to a point opposite a side wall of the sleeve.

It is desired to close the opening 17 as well as the opening 20 to exclude dust, dirt and water from the interior of the socket as well as to retain the grease therein and to prevent any broken and disconnected parts of the joint from accidentally falling through the openings, particularly the opening 20.

To this end the guard 21 of this invention, comprises two substantially semi-circular plates $a$ and $b$ which may be readily brought into association to form a tubular jacket about the cylindrical socket 10 and for the purpose of closing the openings 17 and 20.

The plate $a$ is formed with the opening 22 disposed preferably centrally thereof of such dimensions slightly in excess of the diameter of the shank 16 and through which the shank extends. On opposite sides of and at both ends of the plate $a$ are provided longitudinally elongated slots 23 or openings slightly removed from the side edge of the plate to receive the spring detents 24 formed on the edge portions of the plate $b$.

The plate $b$ is designed to cover the opening 20 in the cylindrical socket 10 and is preferably made of spring steel, and in its normal unattached position assumes an arc or shape having a shorter radius or smaller dimensions than the exterior surface of the socket 10. The detents 24 are preferably, but not necessarily, formed integrally with the body of the guard section $b$ and extend laterally from the longitudinal edges thereof at the end portions of the plate; and in number correspond to the slots 23 on the plate $b$. These detents each have a curved offset shank portion $c$ which is offset outwardly from the plane of the side edges of the guard section $b$ and terminate in detent ends $x$ extended inwardly toward the section $b$, and from which ends $x$ outwardly and obliquely extend projections $d$ which provide finger pieces, as well as providing surfaces to bear against and ride over the outer surface of the socket 10 as the guard section b is being applied to the socket 10 and which action tends to spread the section from its normal position. As the projections d reach the longitudinal edges of the plate section a, which has been applied to the side of the socket, they also ride over these edges until the detent end x thereof reaches the slots 23, when the resiliency of the guard section b will cause the detents to snap into slots and to be securely, but removably, held therein.

Thus with the sections a and b in their assembled positions on the socket 10 they are tightly held in position about the outer surface of the socket and form a jacket for excluding dirt, dust and water, retaining grease within the socket; and the section b further prevents the parts within the socket, which may become broken through the crystallization, from falling out through the opening 20 of the socket, due to the fact that ends x of the detents 23 extend in a direction slightly toward the section plate b and thereby resist disengagement from the slots 23 by ordinary pressure exerted against the section b through the opening 20 of the socket.

The slots 23 in the section a are elongated for the purpose of permitting the section a to slide longitudinally on the socket with the rocking movement of the stud or shank 16, without causing the plate section b to move therewith, and thereby reducing or eliminating any friction or binding which would hinder the free and easy movement of the shank 16. This free movement of the shank 16, is further provided for by having the portions c of the detents 24 offset sufficiently to provide a clearance between themselves and the portions e adjacent the slots 23 of the section a.

In Figures 4 and 5 modifications of the guard are shown but the same reference characters will be employed to denote the same parts although characterized by different exponents in the different modifications.

In order to prevent the bearing pad 14a from becoming tilted and projecting through the opening 20', the section b' may be modified, in Fig. 4, providing it with an inwardly extending indentation 25 which forms a continuation of part of the interior wall of the socket. This indentation 25 further serves the purpose of preventing a sliding or shifting movement of the plate b' on the socket when the section a' moves with the shank or stud 16a.

In some instances it may be only required or desired to close the opening 20b in the cylindrical socket 10b, and therefore only the section b2 may be employed. In such instances, however, the outer surface of the socket 10b will be formed with notches or indentations 26, as shown in Fig. 5, on opposite sides thereof and at points where detents 24b will occur, when the plate b2 is placed on or about the socket 10b as shown. These indentations 26 may be formed at the time socket 10a is made, preferably by drop forging or as is otherwise found to be convenient.

The section plate b2 as shown in Fig. 5 may be formed to be provided with an indentation 25 such as shown in Fig. 4.

As previously explained, the guard of the present invention can be very quickly and simply applied and can be equally as easily and deliberately removed by exerting an outward pressure upon the finger piece d, d' and d2 of the detents 24, 24a and 24b respectively, so as to move the latter out of engagement with the slots 23 or 23a of the section plate a or a' or from the notches 26 formed in the socket 10b, as shown in Fig. 5.

From the foregoing it will be observed that a very effective, durable, simple and inexpensive guard or shield for ball and socket joints of the type mentioned is provided and that obviously the invention as described and shown herein is susceptible of modifications, as parts may be omitted, added or substituted without departing from the scope thereof as expressed in the appended claims.

What is claimed as new is:

1. A guard of the kind described comprising two complemental sections of sheet material adapted to form a tubular jacket when associated, one of said sections being of resilient metal and having a clasp-like action to be sprung about and snugly fit an object to which it is applied, detents carried on the side edge portions of said clasp-like section, said other section having elongated longitudinally extending slots therein to receive said detents and to hold said sections together while permitting movement of said latter section without moving said clasp section.

2. A guard for tubular socket joints having an opening in the socket and comprising a resilient clasp substantially semi-tubular to snugly fit the socket and cover the opening therein, said clasp having inwardly extending detents at its side edges to cooperate with a keeper means to retain said guard on said socket, and obliquely, outwardly extending guide surfaces on said detents to engage and ride over the surface of said socket to cause the guard to be sprung open as it is applied.

3. A guard for tubular socket joints having an opening therein and comprising a flexible substantially semi-tubular clasp of spring sheet material to snugly fit the socket and cover the opening therein and provided with detent means at its side portions to cooperate with a keeper means on the socket to which said guard is applicable, said guard being provided with an inwardly extending projection at a central portion thereof to extend into and substantially fill the opening of said socket.

4. The combination with a housing provided with an opening therein, of a guard for covering said opening and comprising a resilient plate shaped to conform generally to the exterior contour of the housing at or about said opening therein, and having a self-acting clasp-like action about the housing and extending partially and snugly fitted therearound, and yieldable, releasable detent means carried on opposite side edges of said guard to cooperate with keeper means on the housing.

5. The combination with a housing provided with an opening, of a guard for covering said opening and comprising a resilient plate shaped to conform generally to the exterior contour of the housing at or about said opening therein, and having a self-acting clasp-like action about the housing and extending partially and snugly fitted therearound, and releasable means carried by said guard to cooperate with keeper means on the housing, said guard being provided with a surface extending inwardly of said opening in the housing.

6. The combination with a housing provided with openings therein, a laterally movable arm extending through one of the openings, of a guard comprising two complemental sections of sheet material adapted to jacket about the housing when associated together, one of said sections having an aperture therein through which said arm extends, means for maintaining the parts together and permitting said apertured section to move with said arm without moving said other section.

7. The combination with a housing provided with openings therein, a laterally movable arm extending through one of the openings, of a guard comprising two complemental sections of sheet material adapted to jacket about the housing when associated together, one of said sections having an aperture therein through which arm extends, the other of said sections being of resilient metal and having a clasp-like action to spring open and snugly fit the housing detents carried on the side edge portions of said clasp-like sections, and said other sections having elongated longitudinally extending slots therein to receive said detents and lock said sections together while permitting longitudinal movement of said apertured sections without moving said clasp section.

8. A guard of the kind described consisting of a substantially arcuate plate-like member of resilient material and having a clasp-like action to be sprung open and snugly clasp a corresponding surface, the opposite longitudinal side edges of said guard having diverging guide fingers thereon to engage and ride over said surface to which it is applicable to cause the guard to be sprung open as it is applied thereto, said guide fingers having detent portions to engage keeper portions on said surface, whereby the guard is locked in position.

9. A guard for a ball and socket joint wherein a shank extends from the ball through an opening in the socket, said guard comprising two complemental sections of sheet material adapted to encircle the socket when associated together, means for detachably connecting said sections together, one of said sections having an aperture therein through which said shank extends and movable by the movement of said shank, said opening having a diameter less than the diameter of said ball, said guard serving to retain grease, exclude dirt and prevent the escape of the ball from the socket in case of failure of any of the parts.

WILLIAM TODD.